Feb. 11, 1941.    H. C. HOLLINGER    2,231,850
AUTOMATIC BALER BLOCK DROPPER
Filed Sept. 19, 1938    7 Sheets-Sheet 1
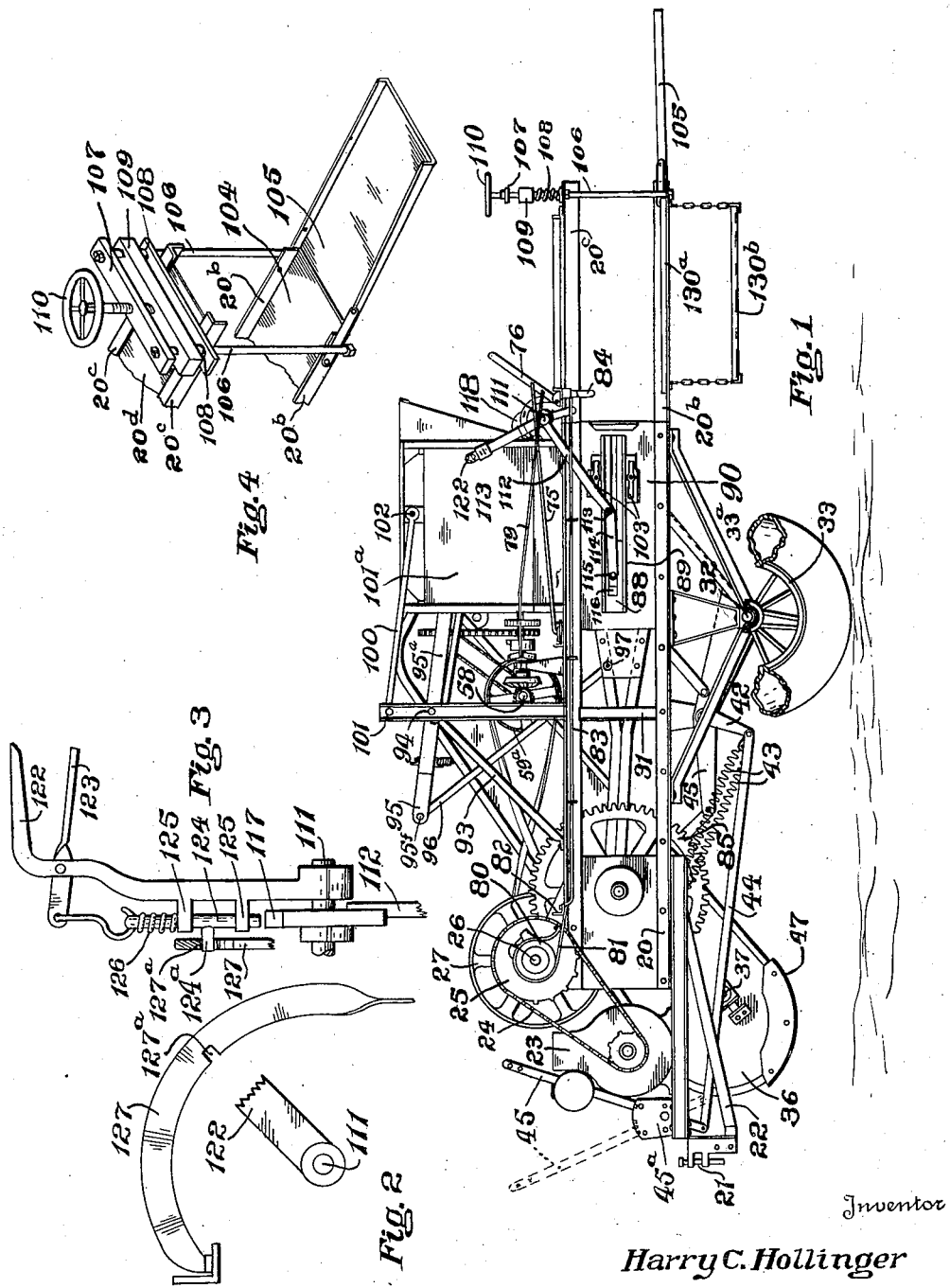
Inventor
Harry C. Hollinger
By Walter W. Burns
Attorney Feb. 11, 1941.   H. C. HOLLINGER   2,231,850
AUTOMATIC BALER BLOCK DROPPER
Filed Sept. 19, 1938   7 Sheets-Sheet 2
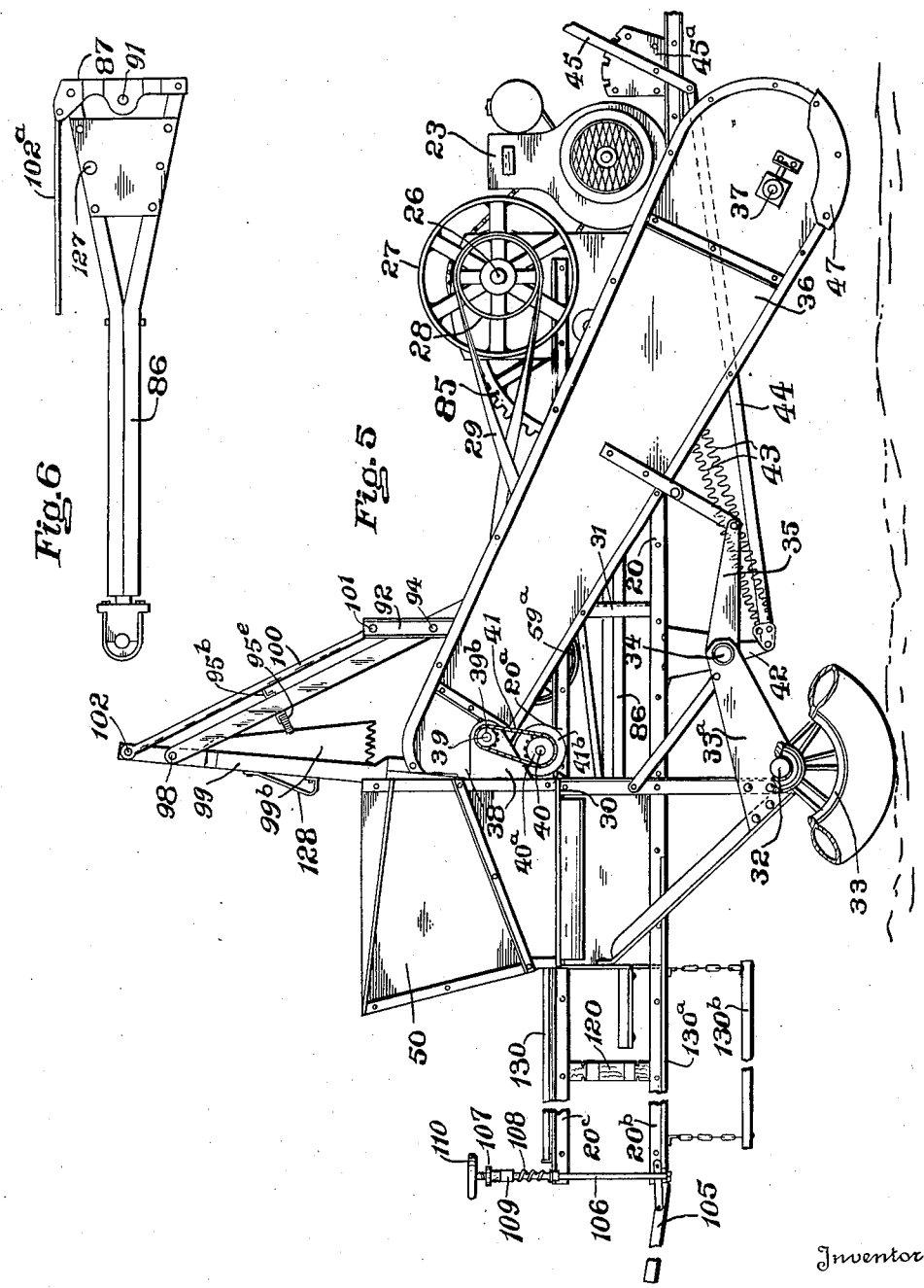
Inventor
*Harry C. Hollinger*
By *Walter W. Burns*
Attorney Feb. 11, 1941. H. C. HOLLINGER 2,231,850
AUTOMATIC BALER BLOCK DROPPER
Filed Sept. 19, 1938 7 Sheets-Sheet 3
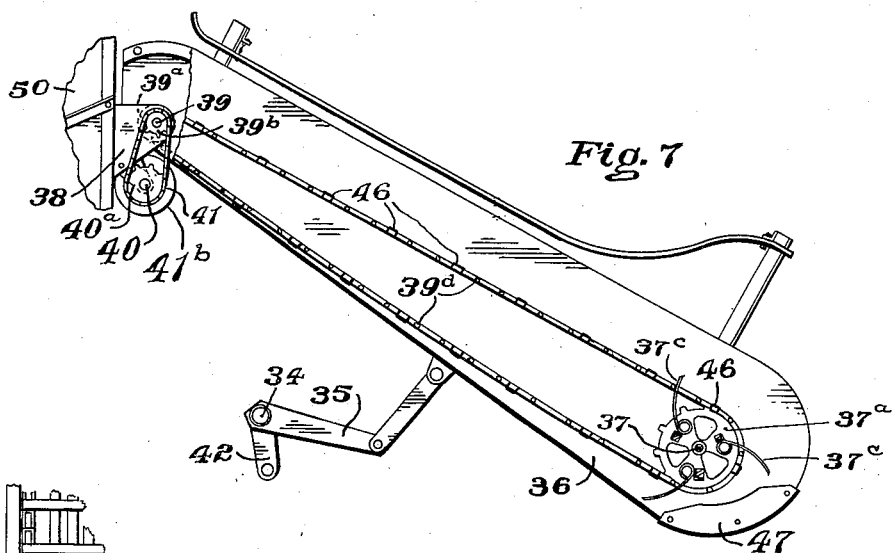
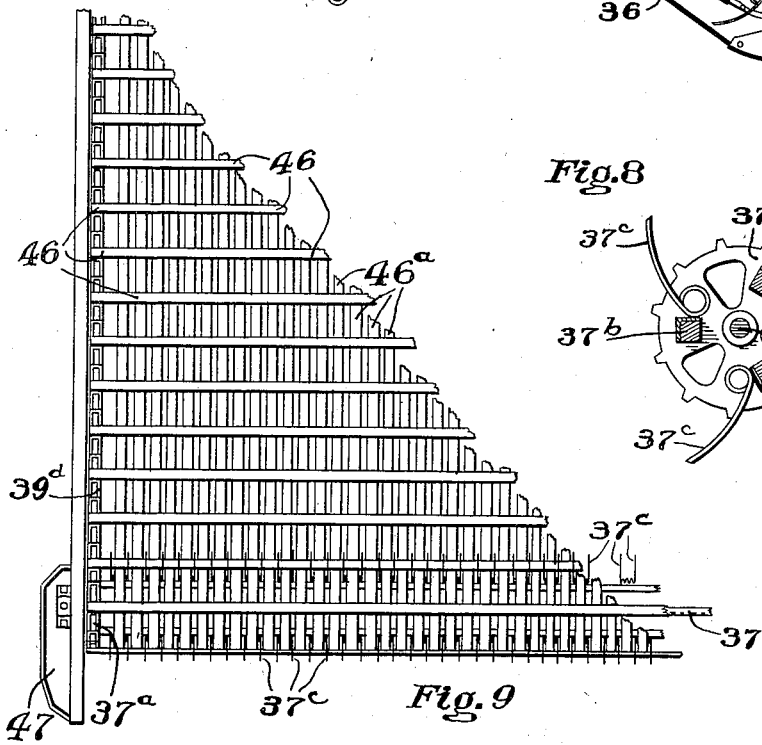
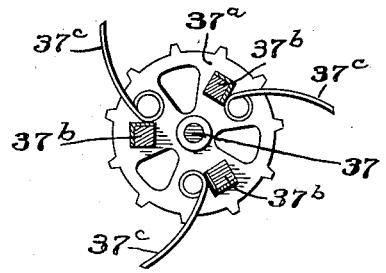
Inventor
*Harry C. Hollinger*
By Walter W. Burns
Attorney

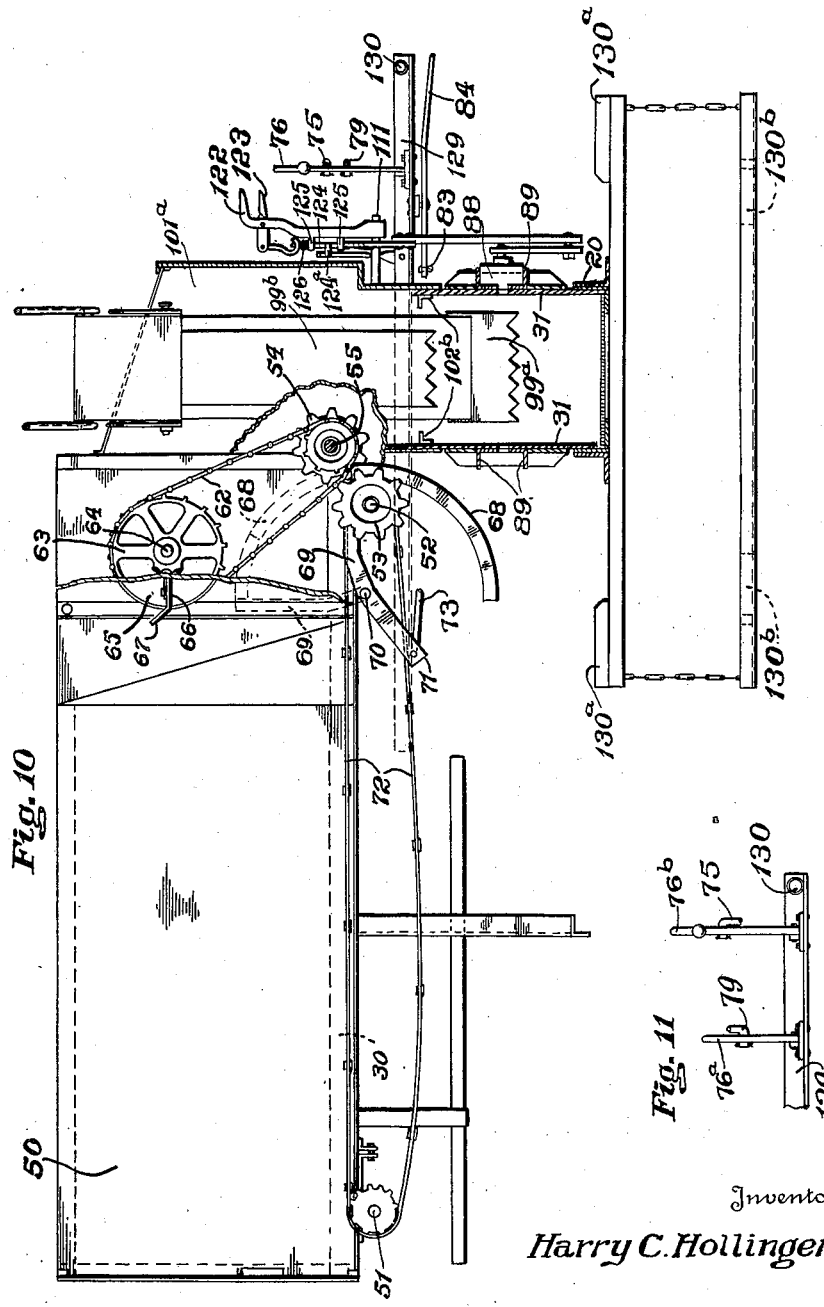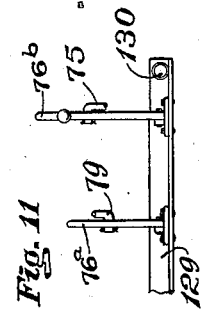

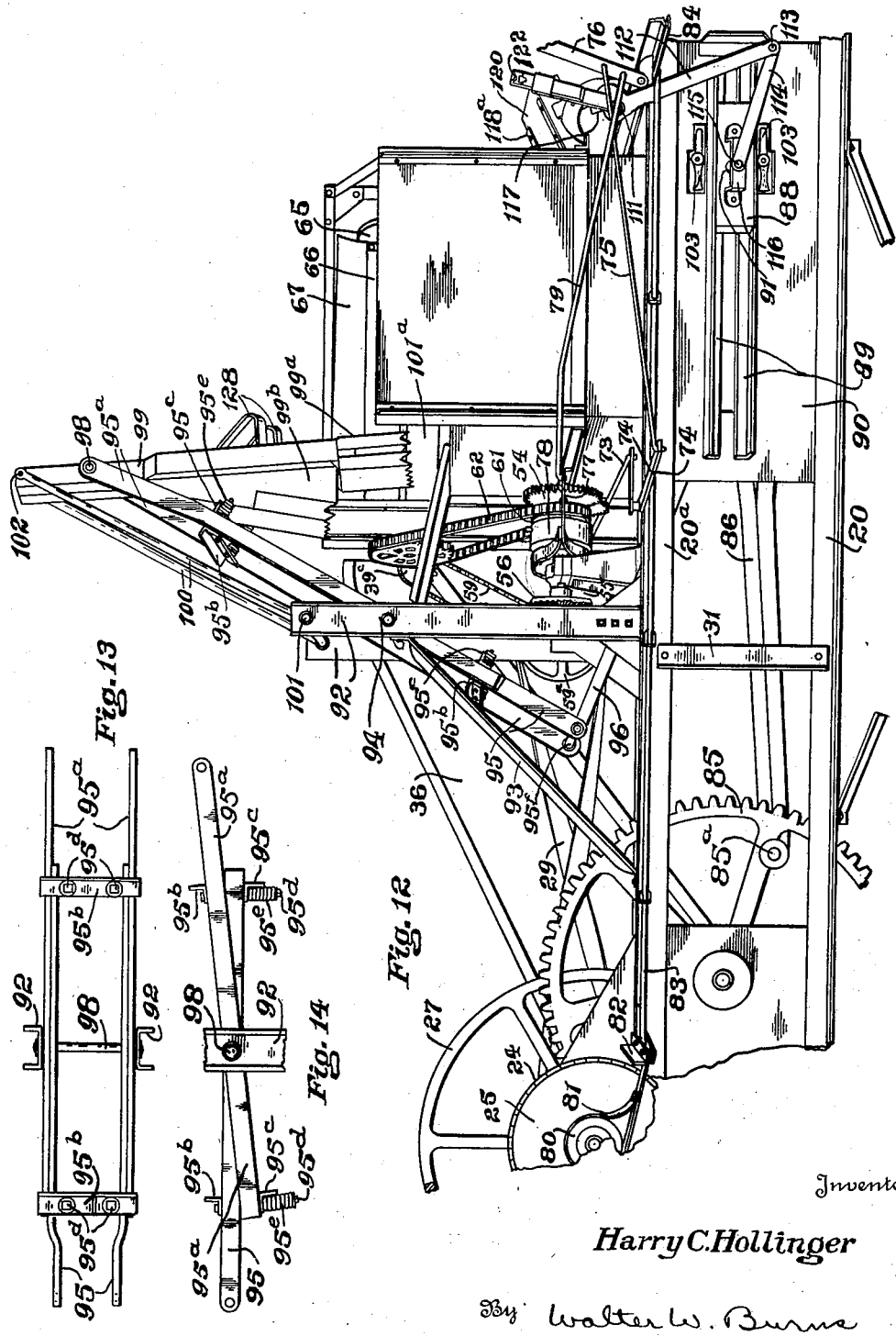

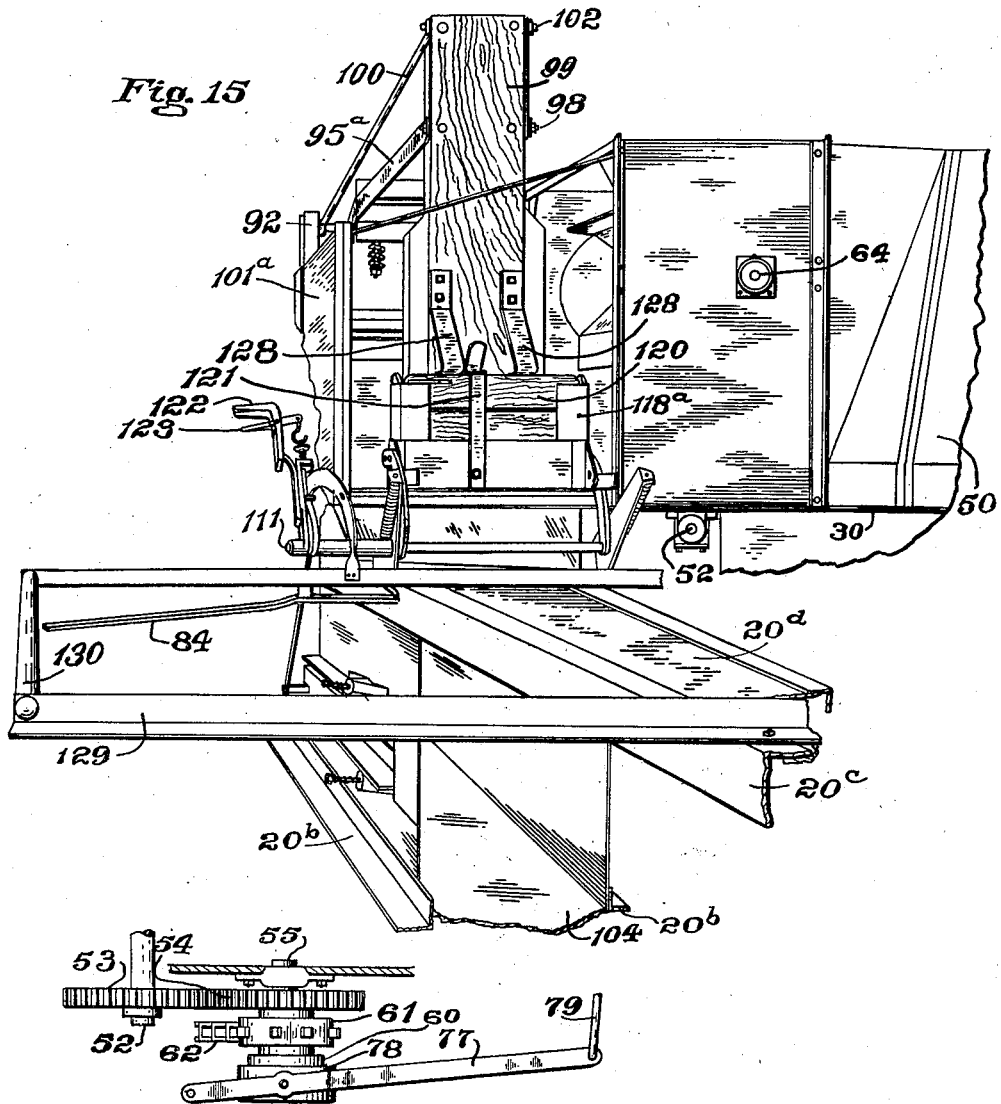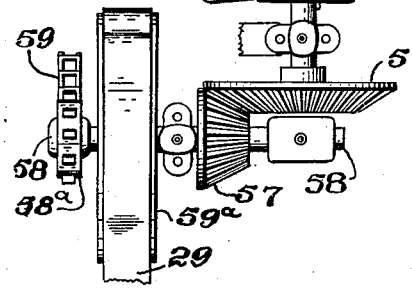

Feb. 11, 1941.  H. C. HOLLINGER  2,231,850
AUTOMATIC BALER BLOCK DROPPER
Filed Sept. 19, 1938  7 Sheets-Sheet 7

Inventor
Harry C. Hollinger
By Walter W. Burns
Attorney

Patented Feb. 11, 1941

2,231,850

UNITED STATES PATENT OFFICE 2,231,850

AUTOMATIC BALER BLOCK DROPPER

Harry C. Hollinger, York, Pa., assignor to A. B. Farquhar Company, Limited, York, Pa., a limited partnership of Pennsylvania Application September 19, 1938, Serial No. 230,673

10 Claims. (Cl. 100—24)

This invention relates to balers and particularly to a mechanism for automatically dropping the baler blocks which are used to separate the material which is being pressed for one bale from the material to follow for the next bale.

In baling machines, the material is pressed by successive operations of a power operated ram to compress the mass into a sufficiently small space to permit of the application of the wire or other securing means. When the blocks which separate the material of two successive bales are dropped into place, difficulty has been experienced in getting the blocks into their proper successive places at the proper time between the strokes of the feeding and ramming devices.

To this end, the present invention has for its primary object the provision of an improved mechanism for dropping the baler blocks.

Another object of the invention is the provision of means whereby the operator at any stage in the cycle of operation of the ram may operate the control mechanism to cause the block to be dropped automatically when the proper instant arrives.

A further object of the invention is the provision of a means for coordination of the operation of the ram, horse-head and block dropper.

A still further object of the invention is the provision of a baler block dropper mechanism having a mechanical connection between the baler ram and the dropper whereby, at the will of the operator, the block dropper may be operated to put the block in position for the horsehead to operate to force the block to drop the next time it performs a packing operation.

Other and further objects of the invention will be apparent to those skilled in the art from a reading of the complete specification and claims.

In the accompanying drawings, the invention has been illustrated with general figures wherein some of the details have been omitted for the sake of clearness. These details are illustrated in detail views.

Referring to the drawings where one embodiment is illustrated as applied to a pick-up baler, Fig. 1 is a side elevation of the left side of the pick-up baler.

Figs. 2, 3 and 4 are detail views of parts shown in Fig. 1.

Fig. 5 is a view of the right side of the machine as a whole.

Fig. 6 is a detail view of the ram.

Figs. 7, 8 and 9 are detail views of the pick-up elevator.

Fig. 10 is a sectional view showing the transverse conveyor, parts being broken away and omitted for purposes of illustration.

Fig. 11 is a modification showing two levers $76^a$ and $76^b$ as alternative structure for the lever 76 at the right side of Fig. 10.

Fig. 12 is a partial perspective view of the left side of the machine.

Figs. 13 and 14 are detail views of structure shown in Fig. 12.

Fig. 15 is a rear perspective view of the block dropper.

Fig. 16 is a detail view of operating gearing.

Similar reference characters refer to the same or similar parts throughout the specification and drawings.

Figure 17:
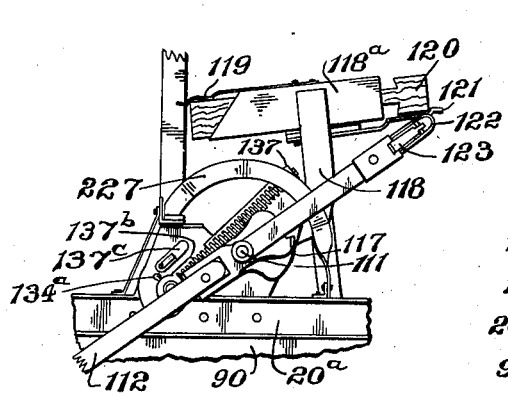
Figs. 17 to 22 are detail views of the dropping mechanism.
Figure 18:
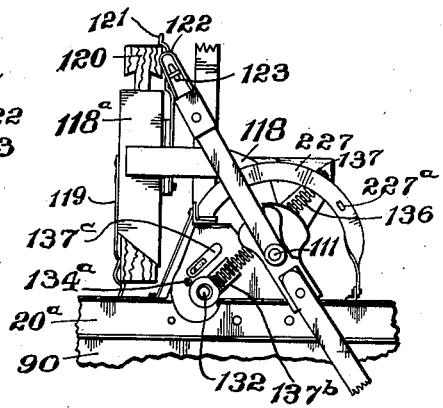
Figure 19:
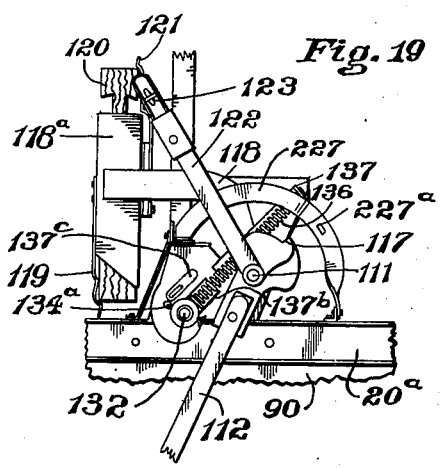
Figure 20:
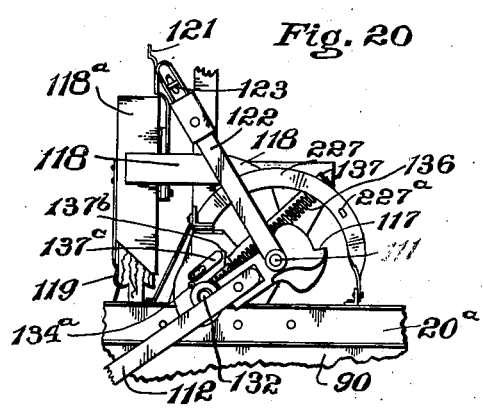

Referring to Figs. 1 and 5 of the drawings, longitudinal frame members 20 are provided at their forward end with a hitch or other securing means 21 to be attached to the rear of a tractor or other draft machine. Suitable braces 22 are provided to reinforce the connection between the hitch and the main frame members 20.

On the forward end of the frame members 20, is mounted a motor 23 which, as illustrated, may be of the internal combustion type. A chain 24 connects a sprocket on the motor shaft with a wheel 25 mounted on a shaft 26 of a reduction gear mechanism. Mounted also on the shaft 26 are a fly-wheel 27 and a pulley 28, the latter operating a power belt 29 to provide power for other mechanism to be later described.

Mounted above the frame members 20 and extending transversely therefrom are feeder frame members 30. Supporting the left ends of these frame members 30 and having their lower ends on the frame members 20 are uprights 31.

An axle 32 is supported by a pair of suitable wheels 33 and carries suitable uprights and braces which connect to the main frame members 20 and the transverse frame members 30. Connected to the axle 32 is a plate bracket $33^a$ which carries the right end of a rock shaft 34 which is supported at its left end by the main frame member 20. The rock shaft 34 carries an arm 35 which is pivotally connected to the underside of the pick-up frame 36.

Referring now to Figures 7, 8 and 9, the pick-up frame carries at its lower end a shaft 37 which has, between the sides of the frame 36, a drum which comprises a pair of sprocket wheels $37^a$ which between them carry transverse fingered rods $37^b$, the fingers $37^c$ of which extend to a line near the ground when the pick-up frame is in lowered position. The upper end of the frame is supported on a shaft 39 which is journalled in a pair of brackets as at 38. These brackets are supported by the frame members 30. The shaft 39 which is pivotally mounted in the brackets 38, also carries sprockets 39ª within and adjacent the frame members 36. A sprocket 39ᵇ is mounted on the end of the shaft 39 and drives a sprocket 40ª on a shaft 40 by a chain 41. A roller 41ᵇ is mounted on the shaft 41 and acts as a cleaning roller for the pick-up conveyor as well understood in the art. It will be thus clear, that the upper end of the pick-up frame 36 is supported by the brackets 38 and its lower end is supported on the rocker arm 35. Another rocker arm 42 which is connected to the rock shaft 34, with the help of the counter-balance springs 43 secured at one end to the frame, assists in supporting the pick-up frame 36 in the desired position of adjustment. In order to raise and lower the pick-up frame, a link 44 is connected to the rocker arm 42 and at its other end is secured to a hand lever 45 located adjacent the forward end of the main frame members 20, as shown in Fig. 5. This hand lever is provided with the usual grip and dog for cooperation with a quadrant 45ª mounted on the main frame to hold the pick-up frame at any desired adjusted position.

Mounted adjacent each end of the shaft 39 and between and near the side boards of the pick-up frame 36, as already mentioned, are suitable sprocket wheels 39ª which carry chains 39ᵈ which in turn coact with the sprocket wheels 37ª at the lower end of the frame 36 on the shaft 37. Connecting these chains are slats or flights 46 which carry web bands 46ª which are placed between and preferably a distance apart on centers equal to the distance between the fingers 37ᶜ carried by the shaft 37. The pick-up frame 36 is so constructed that it is, in its lowered position out of contact with the ground, the fingers 37ᶜ acting to pick-up the hay, etc., being gathered. Shoes 47 are provided at the lower ends of the frame members 36, to take the shock only in case a protruding stone or abnormally high spot is encountered, thus preventing injury to the pick-up frame or its mechanism. The lower end of the pick-up frame always normally travels out of contact with the ground. This prevents the side draft present in some machines.

On the inner end of the shaft 39 is located a sprocket wheel 39ᶜ which is connected to another sprocket 58ª on the shaft 58 by a suitable chain 59 to provide the drive means for the pick-up mechanism. As the shaft 39 turns, it drives the shaft 40 through the chain 41, thus operating the roller 41ᵇ and the carrier with its belting 46ª and flights 46. These operate the drum on the shaft 37 causing the fingers 37ᶜ to lift the material which is carried along the inclined bottom of the pick-up to be delivered at its upper end into the cross conveyor.

At the completion of the gathering of the material it is delivered to the feeder.

A transverse box 50 with an open front, as shown in Fig. 10, is provided to receive the material from the pick-up and is supported on the frame members 30. In the bottom of the feeder box is provided a transverse conveyor apron 72 which is mounted on conveyor rollers carried by the shafts 51 and 52. On the shaft 52 (see Fig. 16) is a gear wheel 53 which is driven from another similar gear 54. The gear 54 is mounted to turn, at will, on a shaft 55, which shaft has a bevel gear 56 at its opposite end. This bevel gear 56 meshes with a bevel pinion 57 on the end of a shaft 58.

Upon the shaft 58 is mounted a pulley wheel 59ª which is driven by the belt 29, already described. Mounted also on the shaft 58 is a sprocket wheel 58ª which, by the chain 59 drives the sprocket 39ᶜ to drive the pick-up mechanism as already described.

The mounting of the gear 54 on its shaft 55 is by way of a sleeve-clutch member 60 which at the will of the operator may be made to connect the shaft 55 to the gear 54 or cause the disconnection therefrom.

Mounted on the sleeve-clutch member 60 and revolving with the gear 54 is a small sprocket 61. This sprocket 61 drives a chain 62 which in turn drives a larger sprocket 63 mounted on a shaft 64. The shaft 64 extends into and across the feeder box 50 and carries a beater. The beater has at its ends disks 65 to which are secured the beater blades 66. These are arranged substantially radially of the shaft 64 at their inner portions, the outer portions being bent as at 67 to provide a wiping action over the top of the material as it passes to the baling apparatus.

In order to stop, when desired, the passage of material to the baler, there is provided a valve 68 mounted on arms 69, as shown in Fig. 10. The arms 69 are connected to the rock shaft 70 which is moved by the lever arm 71. The rock shaft 70 passes between the upper and lower reaches of the feeder apron 72 which moves the material in the feeder box 50 and which is mounted on rollers carried by the shafts 51 and 52. The arms 69 which carry the valve 68 extend from the shaft 70 at the sides of the upper reach of the feeder apron 72 so that there is no interference in their independent operation.

The operating arm 71 of the rock shaft 70 is controlled in its movement by a rod 73 which is connected at its opposite end to a bell-crank lever 74 which is operated by a rod 75. The rod 75 is connected at its opposite end to a hand lever 76, as shown in Figs. 1 and 12. It is thus clear that when the hand lever 76 is operated in a forward direction, compression will be set up in the rod 75, the bell-crank lever 74 will be turned placing tension in the rod 73 and by means of the crank lever 71, the valve 68 will be swung to its upward position to close the space between the beater blades 67 and the upper reach of the conveyors 72.

Since the delivery end of the feeder conveyor 72 is closed as just described, no hay or other material may be delivered past the valve 68. Cooperating with this valve and its control connections are means for simultaneously stopping the operation of the feeder conveyor belt and also the rotation of the beater blades 66 and 67 located above the delivery end. These connections will now be described.

As already described, the sleeve-clutch member 60 which revolves on and, at will, with the shaft 55, carries the sprocket 61 which drives the beater and the gear 54 which latter, through the gear 53, drives the feeder conveyor 72.

Power being applied to the shaft 58 from the belt 29, will through the pinion 57 and the gear 56, drive the shaft 55. The clutch lever 77 operates a clutch member 78 which, when in engagement with the sleeve clutch member 60, connects the latter to rotate with the shaft 55. Connected to the end of the clutch lever 77 is a rod 79 which is connected at its rearward end to the lever 76 which, as has been described, controls the valve 68. Thus the same forward movement of the lever 76 which has been described as operating to close the valve 68, also by movement of the clutch lever 77, opens connection between the clutch member 78 and the sleeve-clutch member 69, thereby stopping the operation of the beater and the transverse feeder conveyor 72. If desired, separate levers 76ª and 76ᵇ as shown in Fig. 11, may be used to operate the rods 75 and 79 respectively. In either construction, the clutch should be released before the valve 68 is closed.

When the valve 68 is in raised position and the beater blades 66 and 67 and the conveyor 72 are not operating, and it is desired to feed the baler, it is only necessary to move the lever 76 or the levers 76ª and 76ᵇ rearwardly. This causes the lowering of the valve 68 to permit the material to pass and also causes the simultaneous starting of the operation of the beater and the feeder conveyor 72.

The operation of a baler with which the pick-up and feeding mechanism may be used, will now be described.

The sprocket wheel 25, as already described, is operated by the chain 24 from the motor 23. As shown in Figs. 1 and 12, this sprocket wheel is mounted on the shaft 26 of the reduction gear mechanism to revolve therewith or to be released therefrom, depending upon whether or not the clutch 80 is in operative or inoperative position. A clutch-operating lever 81 is pivoted on an out-rigger arm 82 and is operated by an operating rod 83. The rearward end of this rod 83 is secured to a lever 84 which is fulcrumed on the rearward portion of the baler frame adjacent the platform occupied by one of the wire-tying operators. By moving the outer end of the lever 84 in a rearward direction, the rod 83 is moved in a forward direction and the clutch-operating lever 81 operates to disconnect the clutch. Movement of the lever in a forward direction connects the clutch to operate the shaft 26. Keyed to the shaft 26 are a pair of pinions which drive a pair of large crank gear wheels 85. The crank wheels 85 carry a crank 85ª to which is connected one end of the ram 86 which carries at its opposite end a head 87, which is illustrated in Fig. 6. The head 87 moves reciprocally as the crank wheels 85 move the opposite end rotatively. This head 87 carries, at its sides, and is supported by the blocks 88 which travel in guides 89 located on the outside of slitted plates 90. Thees plates connect the frame members 20 with the corresponding frame members 20ª, located thereabove. A rod or axle 91 serves to connect and support the head 87 of the ram 86 from these blocks 88.

Standing upright from the upper main frame members 20ª (see Figs. 13 and 14) are a pair of masts 92 which with the braces 93 support a shaft 94. The shaft 94 carries an oscillating frame comprising two pairs of arms 95 and 95ª. These four arms 95 and 95ª, normally move pivotally about the axis of the shaft 94 as a unit but are capable of relative pivotal movement in pairs as will be later described. Connected pivotally to the forward ends of the arms 95, as at 95ᶠ, are a pair of rods 96 which are pivotally connected at their opposite ends to the ram as at 97. It will thus be seen that as the ram 86 is operated by the crank wheels 85, the frame 95 and 95ª will be caused to oscillate.

At the rearward ends of the frame members 95ª as at 98 is pivoted a horse-head 99, as shown in Figs. 5 and 12, the function of which is to pack the hay or other material in a vertical direction to prepare it for action by the ram head 87. The horse-head includes, in the illustrated embodiment, a main packing end 99ª and an auxiliary packer 99ᵇ located to the rear and slightly above the main packing end 99ª. By this construction the hay or other material is not packed all at the bottom of the hopper which would result in the finished bale being irregular in shape.

It will be noted that the frame members 95 extend farther forwardly than the forward ends of the frame members 95ª and the rearward ends of the frame members 95ª extend farther to the rear than the rear ends of the frame members 95. Adjacent the rear ends of the frame members 95 and the forward ends of the frame members 95ª, there are angle irons 95ᵇ above and angle irons 95ᶜ below all of these being long enough to extend over all four members 95 and 95ª. Extending through openings in corresponding angle iron pieces 95ᵇ and 95ᶜ are a pair of bolts 95ᵈ each carrying a spring 95ᵉ. The nuts on the bolts 95ᵈ are so adjusted that the springs 95ᵉ are held under compression, thus holding the angle pieces 95ᵇ in close relation to the frame members 95 and 95ª, which results in holding the latter in parallel relation. If the horse-head engages any obstruction and is stopped in its normal movement, the springs 95ᵉ will be compressed and the members 95 will be moved at an angular position relative to the members 95ª. This prevents strains and possibly prevents breakage of parts if the horse-head is suddenly stopped.

It is highly desirable that the horse-head perform its packing function while in a vertical plane. To this end, links 100 are provided of a length substantially equal to the distance between the pivot-points 94 and 98. These links 100 are pivotally secured to the upper ends of the masts and the horse-head. Their pivot points 101, 102 are respectively equi-distant from the pivot points 94 and 98. From this description it will be clear that as the ram 87 moves backward to perform its function, the horse-head 99 will be raised and as the ram 87 is withdrawn, the horse-head will be lowered. The position of the horse-head, when at its raised position is above and at the rear end of a hopper 101ª which is located at the delivery end of the transverse feeder conveyor 72. The side wall of the hopper 101ª extends up beyond the lower edges of the beater blades 67 and the bottom of the hopper is even with the bottom of the bale frame to be described.

Attached pivotally to the top edge of the ram head 87 is a plate member 102ª which is supported by guides 102ᵇ attached to the inner sides of the frame members 20ª. This plate 102ª is of a length slightly greater than the travel of the ram. It is placed at a height below the delivery of the transverse conveyor 72. When the ram 86 is in its rearward position, the plate member 102ª will cut off all delivery of hay or other material until the ram 86 and its plate member 102ª are again withdrawn. At the instant it is clear, the horse-head 99 descends and forces the material to a position in the path of the ram head and immediately withdraws for the next baling stroke of the ram head 87.

In the sides of the plates 90 are openings for the usual spring dogs 103, as shown in Figures 1 and 12, which hold the baler blocks and the hay or other material in place after it has been pushed back by the head of the ram.

The frame members 20 and 20ª extend to the rear of the rear position of the ram head 87 and have supplemental frame members 20ᵇ and 20ᶜ (see Fig. 4) to provide for sufficient length to hold the bale during the wiring operation. A top plate 20ᵈ is provided between the top frame members 20ᶜ. A bottom 104 of wood or other suitable material is provided between the lower frame members 20ᵇ. A pivoted tray 105 is provided at the end of the floor 104 to provide for supporting the bale until it is clear of the frame. The upper and lower frame members 20ᶜ and 20ᵇ are adjustable relative to each other at their rear ends. Extending outwardly from the sides of the rear ends of these frame members 20ᵇ and 20ᶜ are members having openings for the bolts 106. The upper ends are secured in a bar 107 and pass through springs 108 which bear at their lower ends upon the frame members 20ᶜ and at their upper ends have the bearing ends of a bar 109. A hand wheel 110 having a screw threaded shank, registers with corresponding threads in the bar 107. The lower end of the shank presses at the middle of the bar 109. By turning the hand wheel 110, the normal pressure between the upper and lower members of the baling frame, on the bale, can be controlled. Thus by turning the hand wheel 110, the pressure on the material being baled during the baling operation, is controlled.

The means for causing the baler blocks to be dropped in place at the proper time, will now be described.

Adjacent to the rear side of the hopper 101ª and at the top frame members 20ª, is journalled a shaft 111 (see Figs. 17 to 20). A lever arm 112 is mounted on but free to oscillate about the shaft 111 except when the two are operatively secured together as will be described.

At the lower end of the lower arm 112, at 113, is pivoted at link 114, which at its other end is pivoted at 115 to the yoke 116. The yoke 116 is secured to the block 88 which reciprocates with the baler ram head. From this it will be clear that the reciprocation of the ram head 87 will cause the oscillation of the lever 112. At the shaft end of the lever arm 112 is a head having a notch 117.

Mounted on the shaft 111 and movable therewith is a block carrier. This carrier comprises the arms 118 which are secured to rotate about the center of the shaft 111 and at their upper ends, they carry a frame 118ª in which the baler block fits for easy movement. This carrier frame 118ª has an open front with guide flanges at the sides to guide the blocks into proper position. At the lower inner or front sides are located two spring clips 119 which are engaged by the block 120, when the latter is put in the carrier frame and which hold it until the block 120 is forced past. At the rear of the carrier frame is another spring clip 121 which engages the block and tends to hold it in place when the frame is swung back to its inoperative position.

Secured to the shaft 111 at its outer end, is a hand lever 122. As shown in Figs. 2 and 15, this hand lever 122 is mounted adjacent to the lever 112 and has a grip lever 123, which is mounted adjacent the handle of the lever 122 and is connected to the upper end of a sliding dog 124. This dog 124 is supported in guides 125 which are located on the side of the lever 122. Above the upper guide 125 and tending to hold the dog 124 in raised position is a spring 126. The lower end of the sliding dog 124 is in the plane of the notch 117 and in such close proximity thereto that when the handle of the lever 122 and the grip lever 123 are drawn together with the fingers, the lower end of the sliding dog 124 will engage the notch 117 of the oscillating lever 112 as it operates with the reciprocations of the ram head 87. When the parts of the baler are in operation and it is desired to drop a bale block, the operator's hand merely grasps the grip lever which immediately drops the dog 124 to a position where it will engage the notch 117 the next time the rear wall of the notch 117 moves forward. This tilts the shaft 111 with the block carrier frame 118ª toward the rear side of the hopper 101ª and at the end of the movement, the carrier 118ª is in a vertical position.

The insertion of the block in the carrier 118ª takes place when the carrier is in its rearward or raised position. In going over the fields which are sometimes rough it is desirable to have a means for holding the block carrier positively in its raised position until such time as the operator desires the block to be put in place. To provide for this, there is a projection 124ª (see Fig. 3) extending from the dog 124. A quadrant 127 is secured to the frame and is provided with a notch 127ª in a position to be engaged by the projection 124ª when the block carrier is in its raised or rear position. As this notch 127ª is in the lower edge of the quadrant 127, the spring 126 will normally hold the projection 124ª therein.

As the operator grasps the lever grip 123, the sliding dog 124 is moved downwardly, its projection 124ª disengaging from the notch 127ª and simultaneously, its lower end will engage the notch 117. This causes the lever 122 and its shaft 111 to be rotated forwardly, thus placing the block carrier within the hopper 101ª. The block 120 is now in position to be engaged by the projections 128 of the horse head 99 when the latter makes its next forward movement. At the next downward movement of the horsehead, the block 120 is forced out of its carrier and into the bottom of the hopper 101ª. The ram now forces the block backward under the tucker roll, to be described, and rearward of the dogs 103 which hold the block in this position. Continued movement reciprocally, of the ram, as the hay is fed, causes the new bale to be moved rearwardly.

In order to return the carrier to its normal position in readiness for another operation, it is only necessary to grip the lever 122 and pull rearwardly. As the notch 117 permits the lever 122 and the carrier frame 118ª to be moved rearwardly, the spring 126 will cause the upward movement of the sliding dog 124 as soon as the projection 124ª registers with the recess or notch 127ª. The lower end of the sliding dog 124 being now out of registry with the notch 117, the carrier frame 118ª is held in its rearward position against accidental displacement by the projection 124ª in its notch or recess 127ª of the quadrant 127.

Figure 21:
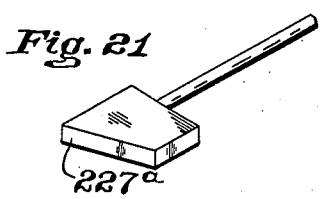
Figure 22:
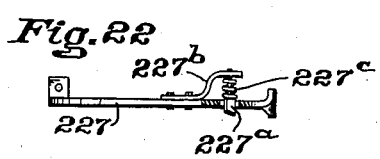

As an alternative structure to prevent accidental or premature movement of the block carrier to its forward position, there is provided a quadrant 227 having a latch 227ª (Fig. 21) extending through an opening in the quadrant 227. As shown in Fig. 22, a guide 227ᵇ supports one end of a spring 227ᶜ, the other end of which holds the latch 227ª out in position to be engaged by the projection 124ª.

When it is desired to swing the block carrier forward, the grip lever 123 and the handle of the lever 122 are brought together in the manner already described. The first part of the movement disengages the projection 124ᵃ from the latch 227ᵃ. Further movement causes the notch 117 of the lever 112 to engage and move the carrier to place the block 120 in operative position.

After the carrier has reached its operative position, the operator releases the lever grip 123. After the block 120 has been forced out of the carrier by the projections 128, the lever 122 may be pulled rearwardly by the operator. As the projection 124ᵃ reaches the latch 227ᵃ, its inclined end will compress the spring 227ᶜ until the projection 124ᵃ passes the latch. The latch will then return to its normal position and the projection 124ᵃ will operate to hold the lever until it is again released by the operator to insert another block.

Figures 23, 24:
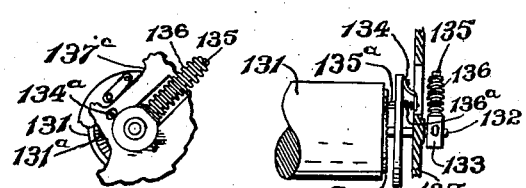
Figs. 23 and 24 are detail views of the tucker.

To hold the hay in place after it has been forced into the bale, a rotating tucker roll which will rotate one way and not the other has been found to be convenient. In action, the ram head 87 and its plate 102ᵃ pass under the tucker roller which is free to revolve therewith. When however, the ram head 87 and its plate 102ᵃ are withdrawn, the roller does not revolve; thus retaining the hay in place. The tucker roller 131 extends across the hopper 101ᵃ adjacent to but slightly below the level of the top of the bale. As shown in Figs. 23 and 24, the shaft 132 upon which the roller 131 is revolubly mounted, carries a plate 133ᵃ which is rigid with the axle and carries a guide 134. This guide, with the plate 133ᵃ, carries a latch 135ᵃ. A spring 136ᵃ bears on the latch 135ᵃ and guide 134 to force the former through a suitably shaped opening in the plate 133 and against teeth 131ᵃ at the end of the roller 131. The latch and teeth are so arranged that as the ram head 87 and the plate 102ᵃ contact it, the roller will revolve but will be held against revolution when the ram is withdrawn.

On the outer ends of the shaft 132 are placed collars 133 having cotter pins 134ᵃ or other means to prevent the shaft turning relative thereto. Extending from the collars 133 and integrally secured thereto are spindles 135 about which are springs 136. The ends of the spindles 135 are held in place by ears at the tops of brackets 137. The shafts 132 extend through elongated slots 137ᵇ (Figs. 23, 24) in the brackets 137 to permit the ram head 87 to push the roller 131 upwardly against the spring 136. As this movement takes place, the plate 133 also moves with the shaft 132 to which it is attached. To provide movement for the bracket 134, a second slot 137ᶜ is provided.

In order to release the block 120 from the carrier frame 118ᵃ, as already indicated, there are provided on the rear side of the horse-head, a pair of projecting members 128 which are so positioned as to engage the top of a block 120 when in the carrier 118ᵃ, the latter being in its forward or operative position. And since the frame of the carrier 118ᵃ has side guide members but no top or bottom, the members 128 force the block past the spring clips 119 to its place. Upon the next strokes of the ram head 87, the block is pushed against the hay of the bale just completed, past the tucker roller 131 and the dogs 103 and the formation of the next bale is begun and continued against the block just inserted.

Secured to the upper main frame members at the rear, are transversely extending members 129, as shown in Figs. 10 and 15. Their outer ends are connected together by back rests or rails 130. Also extending outwardly at the sides of the lower members 20 and 20ᵇ of the main frame are supports for the operators' seats 130ᵃ. Upon these seats, one on each side, an operator sits and wires the bales as they are completed. The bale blocks 120 are provided with slits through which the wire is passed in a well-known manner. A foot rest 130ᵇ is provided below the baler frame upon which the operators place their feet. This foot rest is supported by chains which prevent breakage over rough ground.

The operation of the machine as a whole will now be described.

After the pick-up baler is attached to the tractor or other draft device, the motor 23 is started. The baler operators, one on each side, take their places. The tractor operator releases the lever 45 and by moving it forward places the lower end of the pick-up frame close to the ground but out of contact therewith. The baler operator at the left side of the machine now operates the lever 84 by pushing it forward. This pulls the rod 83 and operates the clutch arm 81 and the clutch 80 to apply power to the shaft 26, thereby starting the belt 29 and applying power to the shaft 58. This action through the sprocket 58ᵃ, chain 59 and pick-up drive shaft 39, starts the pick-up mechanism and the unit is ready for forward movement.

As the hay or other material is reached, the operator on the left side moves the lever 76 or levers 76ᵃ and 76ᵇ rearwardly if not already there. This opens the valve member 68 and by simultaneously closing the clutch member 73, starts the operation of the transverse feeder conveyor 72 and the beater blades 66 and 67.

Also, when the lever 84 was operated, the crank gears 85 were caused to start, thus operating the ram 86, its head 87 and the horse-head 99.

Prior to the actual start of the hay pick-up operation, one of the operators places a baler block in the carrier frame 118ᵃ. The operator then grasps the lever 122 and its grip 123. This causes the carrier with its block to be swung forward so that the block is in vertical position to be dropped by the projections 128 the next time the horse-head approaches its lower position. This having taken place, the ram head 87 will force the block rearward into the baling frame.

The hay or other material is picked up by the pick-up mechanism, carried up and delivered to the transverse conveyor 72. This conveyor with the coacting beater blades 66 and 67, feeds the hay or other material into the baler hopper 101ᵃ. As already described, the alternate operation of the ram 86 and the horse-head 99 will cause the hay to be packed in the baler frame as fast as it is delivered by the transverse conveyor. This action causes the block to be forced rearwardly as the bale behind it is being formed. The block is held against free rearward movement by the tendency of the springs 108 under control of the hand wheel 110 to draw the upper frame members 20ᵈ and the lower frame members 20ᵇ, closer together. This action binds and retards the rearward movement of the baled material, thus keeping the bale in a close compact condition during its formation.

When there is sufficient material for a bale, an operator places another block in the carrier 118ᵃ.

In the case of the dropping of the second and subsequent blocks, an additional operation must be performed. In order to clear the hopper of the hay or other material, prior to the insertion the next block, the lever 76 or levers 76ª and 76ᵇ must be moved forwardly. This action places compression in the rods 75 and 79, opening the clutch member 78, thus disconnecting the driving means for the transverse conveyor 72 and the beater blades 66 and 67 and also raises the valve 68 to its closed position. This cuts off the supply of hay or other material so that the baler block may be dropped behind the material for the bale being formed. The handle of the lever 122 with its grip lever 123 is grasped. This releases the projection 124ª from the notch 127ª. On the next oscillation of the lever 112, the lower end of the dog 124 will engage the notch 117 and the lever 122 will be swung forwardly with its shaft 111 and the block carrier 118ª secured thereto. This places the block in position to be dropped by the horse-head projections 128. The block is then immediately forced behind the bale material. On the first stroke of the ram 86 after the insertion of the block, the latter is pushed rearwardly far enough to clear the dogs 103 which prevent the block from forward movement. As soon as this is accomplished, the operator swings the carrier rearwardly and moves the lever 76 rearwardly to drop the valve 68 and start the conveyor 72 and the beater blades 66 and 67.

The formation of the next bale continues while the operators are wiring the formed bale. As soon as the bale is wired and the outer block is released, it is placed on top of the baler frame ready to be inserted in the carrier. Another block 129 is inserted in the carrier ready for the next insertion. As the bale is pushed into the discharge tray 105, it clears the upper frame members and may fall to the ground. The operation is repeated until the hay or other material is gathered.

From the above it will be clear that there has been provided an automatic dropping mechanism for the baler block which is coordinated with the action of the horse-head and baler ram to have the baler block moved from withdrawn position to its ready position and immediately thereafter, the insertion of the block to its proper position behind the bale.

This automatic coordination of the movement of the block carrier with relation to the horse-head is very important as it is clear that if the block in its carrier is moved forward at the instant the dropper projections on the horse-head are at a position below the top of the block, these projections and the block in its carrier will be in conflict and breakage would occur. With this construction, such a situation cannot arise as the sliding dog 124 with its projection 124ª holds the block carrier in retracted position until the time for proper movement.

While an embodiment of the invention is illustrated and described in detail and is described in one relation, it is to be understood that the disclosures as to details and in the relation shown are to be considered merely as illustrative and that modifications and changes may be made without departing from the spirit of the invention and within its scope as claimed.

Having described the invention, what is claimed is:

1. A block dropping mechanism comprising a baler block holder for carrying a baler block to a position adjacent the path of the material being baled by a baler mechanism, a shaft for swingingly supporting the block holder, a hand lever means rigidly mounted on the shaft, and an operator controlled means on the hand lever means for connecting the same to a power means to cause the block holder to be swung into a position adjacent the path of the material.

2. A block dropping mechanism comprising a baler block holder for carrying a baler block to a position adjacent the path of the material being baled by a baler mechanism, a shaft for swingingly supporting the block holder, a lever means mounted on the shaft for swinging movement relatively thereto, connections for causing the swinging of the lever means, a hand grip lever mounted on the block holder shaft including latch means for connecting said lever means and shaft to cause them to swing together.

3. A block dropping mechanism comprising a baler block holder for carrying a baler block to a position adjacent the path of the material being baled by a baler mechanism, a shaft for swingingly supporting the block holder, a lever means mounted on the shaft for swinging movement relatively thereto, a grip lever rigid with the shaft, connections for initiating the swinging movement of the baler block holder and including an operator-controlled connection between the lever means and the grip lever to cause the baler block holder to move into place adjacent to the path of the material.

4. A block dropping mechanism comprising a baler block holder for carrying a baler block to a position to be moved into the path of the material being baled by a baler mechanism, a shaft for swingingly supporting the block holder, a lever means mounted on the shaft for oscillation relatively thereto, a second lever rigid with the shaft, connections for causing the swinging of the two lever means together and including a hand operated means mounted on one of the levers.

5. A block dropping mechanism comprising a baler block carrier to guide the block from a retracted inoperative position to a position in the path of the material being baled by a baler mechanism, power connecting means, including an oscillating lever, and manually operated control means on the lever and under control of the operator to connect the power means to so move the block from its fully retracted position to dropping position.

6. A block dropping mechanism comprising a pivoted baler block carrier to guide the block from a retracted inoperative position to a position in the path of the material being baled by a baler mechanism, power means, including an oscillating lever mounted on the block carrier pivot, having a power connection to move the block and manual means under control of the operator to connect the power means to so move the block from its fully retracted position to dropping position.

7. A block dropping mechanism comprising a shaft having a hand lever movable pivotally with the shaft, a baler block carrier mounted on the shaft to swing backward therewith to a retracted inoperative position where the block is loaded in the carrier and to a second position from where the block may be forced to a position in the path of the material being baled by a baler mechanism, power means including an oscillating lever mounted to move about the shaft and having an operative coordinated connection to move the block and manual means on the hand lever for connecting the oscillating lever with the shaft to move the block carrier.

8. A block dropping mechanism comprising a shaft having a hand lever movable pivotally with the shaft, a baler block carrier mounted on the shaft to swing backward therewith to a retracted inoperative position where the block is loaded in the carrier and to a second position from where the block may be forced to a position in the path of the material being baled by a baler mechanism, power means including an oscillating lever mounted to move about the shaft and having a power operated link connection to move back and forth and manual means on the lever for connecting the oscillating lever with the shaft to move the block carrier to its second position.

9. A block dropping mechanism comprising a baler block carrier to guide the block from a retracted horizontal position to an operative vertical position, locking means to normally hold the carrier in its retracted position and power means for moving the carrier from its locked retracted position to operative position and a single control means for releasing the locking means and connecting the power means to move the carrier from retracted position to operative position.

10. A block dropping mechanism comprising a baler block holder for supporting and carrying a baler block to a position adjacent the path of the material being baled by a baler mechanism, a shaft for swingingly supporting the block holder, hand operated means mounted on the shaft for swinging therewith, and connections on the hand operated means for causing the swinging of the hand operated means and the block holder at predetermined times relative to the operating cycle of the baler mechanism.

HARRY C. HOLLINGER.